Aug. 6, 1968     T. C. BAKER ET AL     3,395,573

BOTTLE INSPECTION METHOD AND APPARATUS

Filed Jan. 27, 1965     2 Sheets-Sheet 1

INVENTORS
THEODORE C. BAKER
BENNY B. MATHIAS
JAMES R. SAGER
BY

ATTORNEYS

INVENTORS
THEODORE C. BAKER
BENNY B. MATHIAS
BY JAMES R. SAGER
ATTORNEYS

United States Patent Office 3,395,573
Patented Aug. 6, 1968

3,395,573
BOTTLE INSPECTION METHOD AND APPARATUS
Theodore C. Baker, Wayne, Benny B. Mathias, Maumee, and James R. Sager, Toledo, Ohio, assignors to Owens-Illinois, Inc., a corporation of Ohio
Filed Jan. 27, 1965, Ser. No. 428,369
8 Claims. (Cl. 73—104)

ABSTRACT OF THE DISCLOSURE

This invention relates to apparatus for testing glass containers for what is termed a line-over-finish defect.

More particularly, this invention relates to a method and apparatus for inspecting containers in succession for line-over-finish defects which system is sensitive to defects present in the sealing surface of a container finish regardless of the optical orientation of the defect.

---

It has been the practice in the past to examine containers for line-over-finish defects by directing a beam of light onto the surface to be inspected and relying on the reflective nature of the defect as a means for providing a signal in response to the presence of a defect. These prior devices unfortunately are only effective in those situations where the defect is oriented in such a manner that the light will be reflected from the defect to a photosensitive pick-up.

It has been applicants' experience that line-over-finish defects which are produced during the parison forming portion of a glass container manufacture are not always oriented in such a manner as to be picked up by a single light source and photocell. Most line-over-finish defects are produced by the entrapment of an air bubble within the molten glass, which bubble or blister is elongated during the movement of the glass into the neck rings either by a counter blow or by a plunger pressing operation. The blisters which are elongated by movement of the glass in the forming of the containers frequently open out through the surface of the container neck. These elongated blisters frequently occur over the top or sealing surface of the container neck, thus producing the defect which is termed line-over-finish.

In the area of mechanical feeler gauges for measuring surface roughness, it has been proposed to use a sensitive pick-up such as a phonograph pick-up wherein the needle is held against the surface to be tested with the output of the pick-up being fed to a recorder or indicating instrument.

It has been applicants' experience in adapting such a system to the detection of line-over-finish defects in containers that the needles have relatively poor wearing quality with respect to the type of surface being checked. Furthermore, inasmuch as the defects, which are intended to be checked by the present system, are of such varied orientation and configurations, frequently the needles used as the defect sensitive member are broken, thus presenting a costly maintenance problem, particularly with respect to the operation of an inspection system which is intended to have an extended inplant operation without substantial maintenance.

The specific type of defect which the present invention is adapted to detect is disclosed and discussed in application Ser. No. 174,932 of Benny B. Mathias, filed Feb. 23, 1962, assigned to the assignee of the present application.

It should be obvious that it is highly desirable to eliminate those containers which possess line-over-finish defects because of the strong likelihood that an imperfect seal will result when these are filled and capped.

In view of the foregoing, it is an object of this invention to provide a method and apparatus for inspecting containers for line-over-finish defects which is capable of extended periods of use without requiring constant attention.

It is a further object of this invention to provide apparatus for inspecting container sealing surfaces for discontinuities wherein an expendable auxiliary contacter element is used.

It is a still further object of this invention to provide apparatus for inspecting containers for line-over-finish defects in which a continuous strip of flexible material of relatively low cost is utilized as the feeler element contacting the container rim.

Other and further objects will become apparent from the following description taken in conjunction with the annexed sheets of drawings, wherein.

Figure 1:
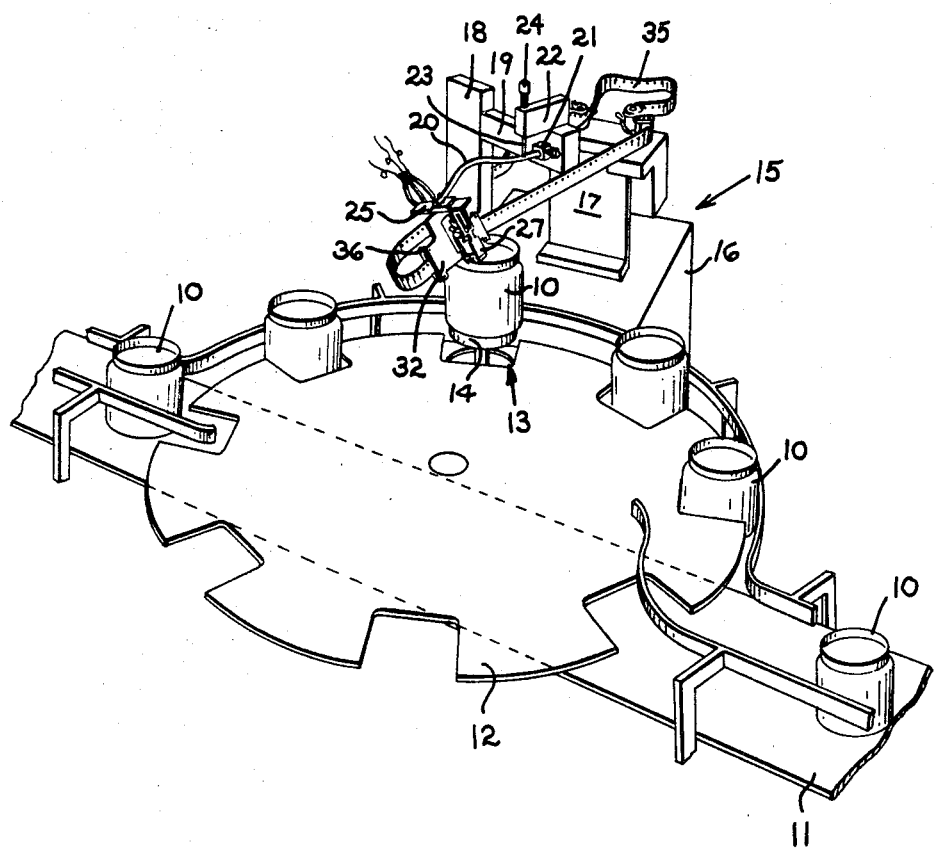
FIG. 1 is a schematic perspective view of the glassware inspecting apparatus of the invention.

With particular reference to FIG. 1, there is shown the general arrangement of a system for handling glass containers 10 through an inspection cycle. The handling equipment basically involves a conveyor 11 which is continuously moving from right to left as viewed in FIG. 1. The containers are placed on the conveyor 11 which moves the containers into receiving position with respect to a counter-clockwise driven star wheel 12 adapted to slide the containers in succession at spaced intervals throughout a series of inspection stations, only one of which is disclosed herein. It should be pointed out that the star wheel is not continuously rotated but rather is indexed so as to present the containers 10 to the inspection station 13 in succession.

As the containers arrive at the inspection station 13, they will be received on a pad 14 which will elevate the containers and at the same time rotate the containers in a clockwise direction.

Adjacent the station 13 is located an inspection head support generally designated 15. This support comprises a base 16 to which a pair of vertical members 17 and 18 are connected. The member 18 carries an arm 19 to which a transducer carrying arm 20 is pivotally connected at 21. The arm 20 extends approximately at right angles with respect to the arm 19, with the arm 19 also serving to support a block 22. The block 22 extends in the direction of the arm 20 and carries a downwardly spring biased member 23 which bears against the upper surface of the arm 20. The member 23 may be adjusted with respect to its biasing force by rotation of the adjusting screw 24 which is threaded in the block 22 and controls the effective length of the spring (not shown) contained in the block.

Figure 3:
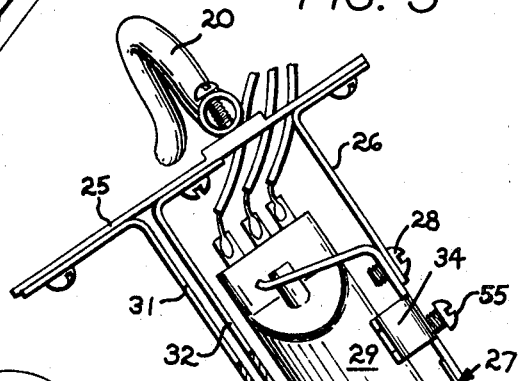
FIG. 3 is a side elevational view of the sensing head of FIG. 2.

The arm 20 extends generally diametrically across a container located at the inspection station and has a plate 25 fixed to its extending end. As best shown in FIG. 3, the plate 25 is mounted to the arm 20 at an angle of approximately 30° with respect to the horizontal. The undersurface of the plate 25 has a slotted, angle bracket 26 fixed thereto. A cartridge carrying bracket 27 is adjustably fixed to the angle bracket 26 by a pair of screws 28 which extend through the slots formed in the downwardly directed portion of the bracket 26.

The bracket 27 carries a commercially available phonograph cartridge 29 which has the usual stylus or needle 30. The undersurface of the plate 25 also has a pair of closely spaced angle brackets 31 and 32 mounted thereto.

The bracket 27 is bifurcated at the top and overlies the shoulder portion of the cartridge 29. A generally U-shaped clip portion 33 confines the lower end of the cartridge 29 and retains the cartridge in abutting relationship with respect to an adjustable bracket 34.

A screw 55 is threaded in the bracket 27 and bears against the bracket 34, so that adjustment of the screw 55 will adjust the position of the cartridge with respect to the bracket 26.

Figure 2:
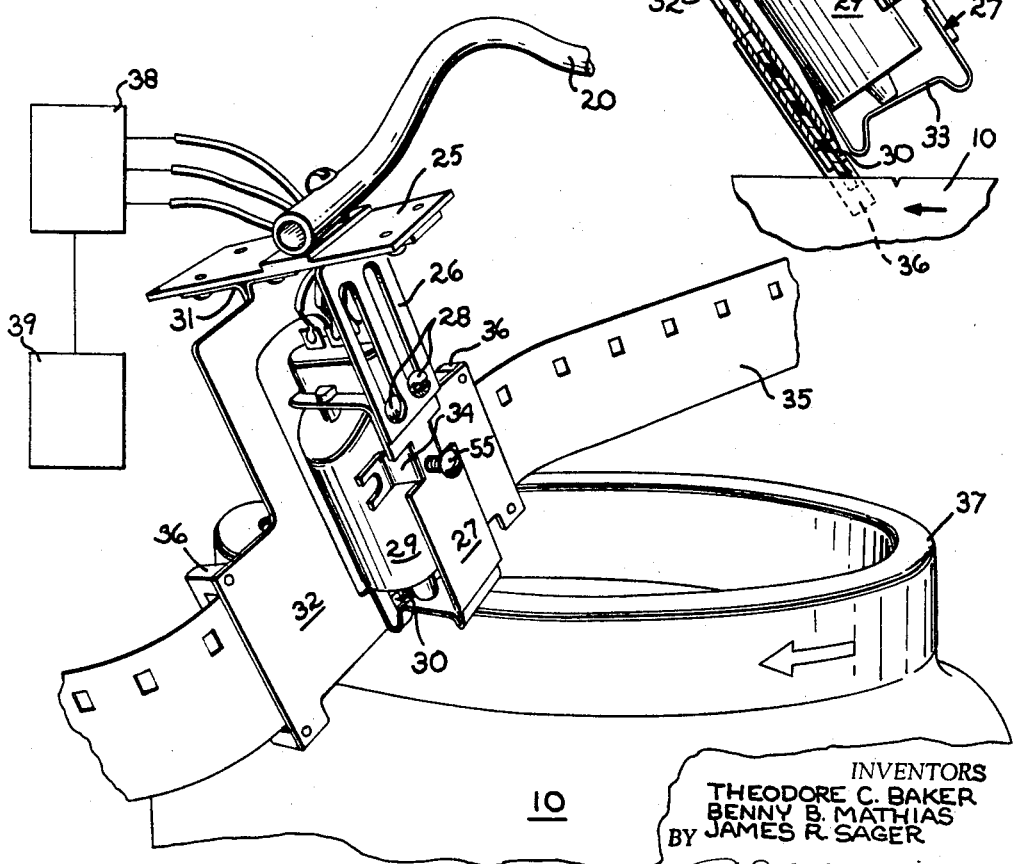
FIG. 2 is a perspective view of the sensing head of FIG. 1 on an enlarged scale.

The parallel, downwardly extending, portions of the angle brackets 31 and 32 frictionally retain a strip of plastic film 35 therebetween and the bracket 32, which may be described as generally T-shaped, carries a pair of film guiding members 36 mounted on the ends of the cross bar of the T, as best shown in FIG. 2.

The members 36 serve as guides to the film strip 35 and maintain the lower edge of the film strip 35 in a particular location relative to the lower edge of the bracket 32. It should be understood that the bracket 32 is provided with a cut-out portion extending from its lower edge upwardly a short distance. This cut-out has sufficient width so that the lower edge of the film strip may bear against the sealing surface 37 of the container 10. This same cut-out or opening extends vertically an amount sufficient to permit the stylus 30 to contact the surface of the film adjacent the portion of the film which is bearing against the container sealing surface 37. The bracket 31 is also notched or provided with an opening midway of its width in facing relationship with respect to the opening formed in the bracket 32.

In this manner, the film, when contacted by a defect in the sealing surface of the container, will be capable of vibrating. The vibration of the film will be sensed by the stylus 30 and the resultant signal produced in the cartridge 29 is fed to an amplifier 38. The amplifier 38 in turn may be connected to a reject mechanism 39 which may be of conventional design.

It should be noted that the film is oriented so that it lies in a plane which is at an angle of approximately 60° with respect to the horizontal plane of the container top surface. Furthermore, the line defined by its edge is not horizontal, but, in fact, is at a 10°–20° angle with respect to the horizontal. This permits the device to bear against one portion of the top of the container. This particular angle is critical only in the sense that it will depend on the specific configuration of the container sealing surface. Many containers do not have a perfectly rounded cross-sectional configuration at the upper sealing area so the film edge is oriented with respect to the sealing surface so that it bears against the portion of the finish which is to be the sealing surface when a cap is applied thereto after filling. As the name implies, most lines-over-finish actually extend up the side of the container neck and over the finish and these are the type of defects which results in an imperfect seal.

As previously stated, one of the objections to the mechanical type surface contacting members is that frequently the members become broken or have poor wearing qualities when considering that it necessarily must be used to test a multiplicity of articles in succession.

With this in view, applicants utilize the film strip 35 whose edge is held in contact with the surface to be inspected and serves as the feeler element, recognizing the fact that the film itself may be subject to breakage.

Figure 4:
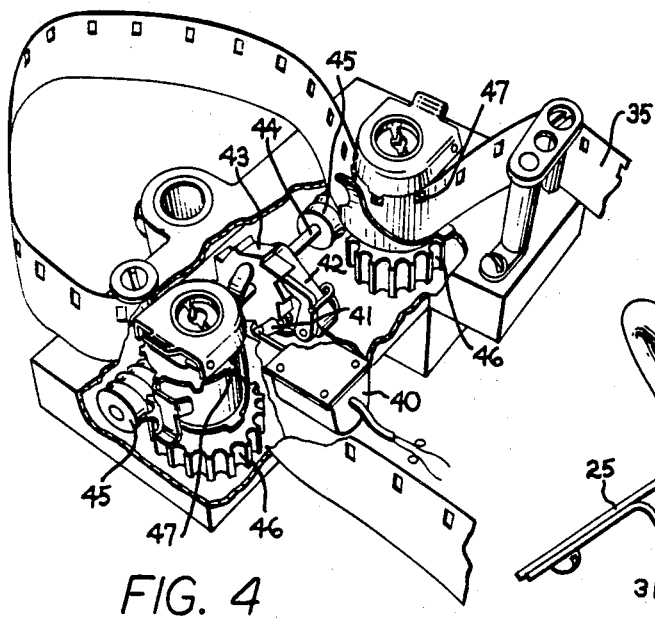
FIG. 4 is a perspective view of the film feeder portion of the apparatus of FIG. 1, on an enlarged scale.

With this in view, and as disclosed in FIGS. 1 and 4, a mechanism is provided for moving the film strip 35 at predetermined intervals, a small amount, so as to periodically present a fresh feeler element.

The mechanism for indexing the film strip 35 is shown in some detail in FIG. 4 and comprises a solenoid 40 which operates a crank arm 41. The crank arm 41 is connected to a pawl 42 which, in cooperation with the ratchet wheel 43, periodically rotates the shaft 44. The shaft 44 carries two worms 45 which are in mesh with worm gears 46. The worm gears 46 carry film drive sprockets 47.

Thus, it can be seen that the frequency with which the solenoid 40 is energized will determine the frequency of the indexing movement of the film strip 35. It is anticipated that the frequency with which the film strip 35 is indexed will depend to a certain extent upon the frequency with which the containers being tested are found to be defective. However, the solenoid may be operated after a preset number of containers have been gauged, for example with each complete 360° index of the star wheel.

As a practical matter, considering that the occurrence of a defect may in each instance cause the film 35 to be chipped along its edge, it is applicants' intention that each time the sensing head indicates that a defect has been found, the solenoid 40 be operated so as to ensure that the film 35, which is located in the plane of the stylus 30, be undamaged for testing of subsequent containers.

Having described the mechanism involved in this testing apparatus, it will be apparent that the operation of the device provides a system of measuring in which the containers are rotated with a strip of expandable strip material acting as the feeler element for mechanically sensing the occurrence of a line-over-finish defect in the container rim. By providing a system in which the expandable strip may be periodically renewed, in a sense, with respect to the portion thereof which is utilized to operate as a feeler, applicants have provided a method of checking the sealing surface of glass containers for line-over finish defects which is capable of extended operation in use without requiring frequent maintenance.

Various modifications may be resorted to within the spirit and scope of the appended claims.

We claim:

1. The method of inspecting a plurality of glass containers for line-over-finish defects comprising, the steps of moving a first container into an inspecting station, rotating the container in an upright position about its central axis, placing the edge of a strip of flexible material in contact with the sealing surface portion of the container, supporting said strip of material so that it is free to vibrate at the edge in response to the sensing of a defect in the container sealing surface, and sensing the vibration of said flexible material to detect a line-over-finish defect.

2. The method of inspecting a plurality of glass containers for line-over-finish defects comprising, the steps of moving a first container into an inspecting station, rotating the container in an upright position about its central axis, placing the edge of an elongated strip of flexible material in contact with the sealing surface portion of the container, supporting said strip of material so that a portion thereof is free to vibrate in response to the sensing of a defect in the container sealing surface, sensing the vibration of said flexible material to detect a defect in the container, repeating the above sequence of steps on subsequent containers and indexing said strip of flexible material in a lengthwise direction at the end of any inspection sequence in which a defective container was sensed.

3. The method of inspecting a plurality of glass containers for line-over-finish defects comprising, the steps of moving a first container into an inspecting station, rotating the container in an upright position about its central axis, placing the edge of an elongated strip of flexible material in contact with the sealing surface portion of the container, supporting said strip of material so that a portion thereof is free to vibrate in response to the sensing of a defect in the container sealing surface, sensing the vibration of said flexible material to detect the presence of a defect, moving the container from the inspecting station, indexing the strip of material lengthwise so that a new portion thereof is in position to serve as the sensing member, moving a second container into the inspecting station and placing the new portion of the edge of the strip of material into contact with the sealing surface of the second container, rotating the second container about its vertical axis, and repeating the cycle on subsequent containers.

4. Apparatus for testing a plurality of open-mouth glass containers in succession for line-over-finish defects comprising, means for moving the containers in succession to a testing station, means at said station for rotating a container about its central vertical axis, a support adjacent said testing station, an arm connected to said support and extending over the container at the testing station, a transducer carried by the extending end of said arm, an endless strip of flexible material, support means carried by said arm for supporting a portion of said flexible material with its edge in contact with the rim surface of the container, said transducer being a vibration responsive pick-up having a sensitive stylus, said transducer being positioned with its stylus in contact with the strip of material supported by said arm, and means connected to said strip material for periodically advancing said strip material in said arm support, whereby a fresh piece of said flexible material will be placed in contact with successively tested container finishes.

5. Apparatus for testing an open-mouth glass container for line-over-finish defects comprising, means for rotating the container about its central vertical axis, a support adjacent said container rotating means, an arm connected to said support and extending over the rotating container, an elongate strip of plastic film, support means carried by said arm for supporting a length of said film with one edge in contact with the rim surface of the container, a vibration responsive pick-up having a sensitive stylus carried by the extending end of said arm, said transducer being positioned with its stylus in contact with the strip of film in the area of contact with the container, means connected to said strip material in said arm support, whereby successive edges of said flexible material will be placed in contact with successively tested container finishes and means connected to the transducer for responding to the presence of a defect in the container.

6. Apparatus for testing an open-mouth glass container for line-over-finish defects comprising, a testing station, means at said station for rotating a container about its central vertical axis, a support adjacent said testing station, an arm connected to said support and extending over the container at the testing station, a transducer carried by the extending end of said arm, an elongate strip of flexible material, means carried by said arm for supporting a portion of said flexible material with one edge bearing against the rim surface of the container, said transducer being vibration-sensitive and having a sensitive stylus, said transducer being positioned with its stylus in contact with the side of the strip of material adjacent to the portion of the edge in contact with the container, means connected to said strip material for periodically advancing said strip material in said arm support, whereby a fresh piece of said flexible material will be placed in contact with successively tested container finishes and means connected to the transducer for responding to the presence of a defect in the container.

7. Apparatus for testing a plurality of open-mouth glass containers in succession for line-over-finish defects comprising, means for moving the containers in succession to a testing station, means at said station for rotating a container about its central vertical axis, a support adjacent said testing station, an arm connected to said support and extending over the container at the testing station, a transducer carried by the extending end of said arm, a strip of flexible material, support means carried by said arm for supporting a portion of said flexible material with its edge in contact with the rim surface of the container, said transducer being a vibration responsive pick-up having a sensitive stylus, said transducer being positioned with its stylus in contact with the side of the strip of material supported by said arm, and means connected to said strip material for periodically advancing said strip material in said arm support, whereby a fresh piece of said flexible material will be placed in contact with successively tested container finishes and means connected to the transducer for responding to the presence of a defect in the container causing said strip to vibrate.

8. Apparatus for testing a plurality of open-mouth glass containers in succession for line-over-finish defects comprising, means for moving the containers in succession to a testing station, means at said station for rotating a container about its central vertical axis, a support adjacent said testing station, an arm connected to said support and extending over the container at the testing station, a transducer carried by the extending end of said arm, a strip of flexible material, support means carried by said arm for supporting a portion of said flexible material with its edge in contact with the rim surface of the container, said support means comprising a pair of relatively flat members between which the flexible material is frictionally retained, a pair of cut-out portions formed in the lower edge of said flat members and guide means formed on said support for maintaining the edge of said flexible material in spanning relationship to said cut-out portions, said transducer being a vibration responsive pick-up having a sensitive stylus, said transducer being positioned with its stylus in contact with the side of the strip of material supported by said arm, and means connected to said strip material for periodically advancing said strip material in said arm support, whereby a fresh piece of said flexible material will be placed in contact with successively tested container finishes and means connected to the transducer for responding to the presence of a defect in the container causing said strip to vibrate.

References Cited
UNITED STATES PATENTS

| | | | |
|---|---|---|---|
| 3,196,550 | 7/1965 | McMeekin | 209—90 X |
| 3,273,710 | 9/1966 | Early et al. | 209—88 |
| 3,274,682 | 9/1966 | Worthington | 340—261 X |
| 3,313,409 | 4/1967 | Johnson | 209—75 X |

JOHN W. CALDWELL, *Primary Examiner.*

D. L. TRAFTON, *Assistant Examiner.*